United States Patent
Knaus et al.

(10) Patent No.: US 7,949,893 B1
(45) Date of Patent: May 24, 2011

(54) VIRTUAL USER INTERFACE FAILOVER

(75) Inventors: Anton William Knaus, Bethel Park, PA (US); James Andrew Ignatuk, Cranberry Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 369 days.

(21) Appl. No.: 12/112,484

(22) Filed: Apr. 30, 2008

(51) Int. Cl.
*G06F 11/00* (2006.01)
(52) U.S. Cl. .......................................................... 714/4
(58) Field of Classification Search .................... 714/3, 4
See application file for complete search history.

(56) References Cited

U.S. PATENT DOCUMENTS

| | | | |
|---|---|---|---|
| 6,728,897 B1 | 4/2004 | Cramer et al. | |
| 6,816,980 B1 * | 11/2004 | Fukuhara et al. | 714/4 |
| 6,944,785 B2 * | 9/2005 | Gadir et al. | 714/4 |
| 7,039,828 B1 | 5/2006 | Scott | |
| 7,051,050 B2 | 5/2006 | Chen et al. | |
| 7,117,303 B1 | 10/2006 | Zayas et al. | |
| 7,305,581 B2 * | 12/2007 | Geng et al. | 714/11 |
| 7,467,191 B1 * | 12/2008 | Wang et al. | 709/221 |
| 7,505,401 B2 * | 3/2009 | Kashyap | 370/217 |
| 7,734,947 B1 * | 6/2010 | Frangioso et al. | 714/4 |
| 7,818,408 B1 * | 10/2010 | Ignatuk et al. | 709/221 |
| 2002/0116593 A1 | 8/2002 | Kazar et al. | |
| 2002/0129272 A1 * | 9/2002 | Terrell et al. | 713/201 |
| 2003/0018927 A1 * | 1/2003 | Gadir et al. | 714/4 |
| 2003/0033412 A1 * | 2/2003 | Sundaresan et al. | 709/227 |
| 2006/0107108 A1 * | 5/2006 | Geng et al. | 714/11 |
| 2008/0275989 A1 * | 11/2008 | Ebersole et al. | 709/225 |
| 2009/0063501 A1 * | 3/2009 | Buckler et al. | 707/10 |
| 2009/0073875 A1 * | 3/2009 | Kashyap | 370/228 |
| 2010/0114889 A1 * | 5/2010 | Rabii et al. | 707/737 |

* cited by examiner

*Primary Examiner* — Marc Duncan
(74) *Attorney, Agent, or Firm* — Cooper Legal Group, LLC

(57) ABSTRACT

A virtual user interface allows a collection or cluster of data storage devices (nodes of the cluster) to be managed remotely by providing access to cluster management software running on one or more nodes of the cluster. Moreover, the virtual user interface fails-over, such that, if a node hosting an instance of the virtual user interface is unable to continue hosting (e.g., communication becomes unreliable, hardware failure, etc.), the hosting duties are substantially automatically migrated to another node in the cluster. Further, failover rules are substantially automatically organized at an initiation of the cluster, and adjusted in accordance with ongoing events occurring in the cluster to provide an administrator with substantially seamless cluster management capabilities.

20 Claims, 10 Drawing Sheets

VIRTUAL USER INTERFACE FAILOVER

It can be appreciated that there is an ever increasing amount of data that needs to be stored and managed. For example, many entities are in the process of digitizing much of their records management and/or other business or non-business related activities. Similarly, web based service providers generally engage in transactions that are primarily digital in nature. Thus, techniques and mechanisms that facilitate efficient and cost effective storage of vast amounts of digital data are being implemented.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In order to manage a group of data storage components (e.g., a clustered storage system), for example, a storage system administrator discovers and connects to the system (e.g., identifies a remote connection access point and remotely accesses the system through the remote access point). The administrator typically makes use of cluster management software present on one or more nodes or controllers of the cluster that facilitates remote administration of the system. Currently, a specified local virtual interface (VIF), restricted to a specific controller, is typically designated as a sole access point for the management software to access the storage system. While the administrator may have access to all components in the clustered storage system from this single access point, and may be able to perform typical administrative and management functions in the system, the VIF may not failover if a connection or the access point controller fails. This can lead to the clustered storage system remaining unmanageable until the administrator can discover and connect to another management VIF on another controller in the system.

A virtual interface (VIF) failover scheme is disclosed herein that allows an administrator to manage a cluster of data storage components as a single entity, rather than as a collection of disparate components. The virtual interface generally comprises, among other things, an IP (internet protocol) address that provides access to the cluster, and more particularly to a hosting of a user interface for cluster management software. In the event that the particular storage component, or a port on the component, upon which the user interface is hosted becomes unavailable (e.g., a VIF failover), the hosting of the user interface (e.g., the hosting of the VIF) is triggered to migrate to another node, or another port on the same node, in the cluster. That is, respective nodes in the cluster have the cluster management software installed thereon, but a corresponding virtual user interface access for the software is merely hosted on one node at a time, and can migrate to other nodes as necessary. Such migration or host shifting generally occurs automatically and/or according to pre-defined rules so that it is substantially invisible to the administrator, affording cluster management continuity regardless of which nodes, or ports, are added to and/or removed from the cluster (e.g., to adjust the storage capacity of the cluster). Moreover, regardless of (the amount of) user interface hosting migration, the VIF essentially maintains the same IP address so that the administrator has continuity with regard to accessing the cluster management software. Also, failover rules can be configured or updated automatically in accordance with nodes becoming available and/or unavailable, at least for purposes of hosting the user interface. Such a VIF failover scheme mitigates access downtime, improves reliability, and provides a substantially seamless failover approach, which is important given the significance of storage system management to organizations and/or ongoing business concerns.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
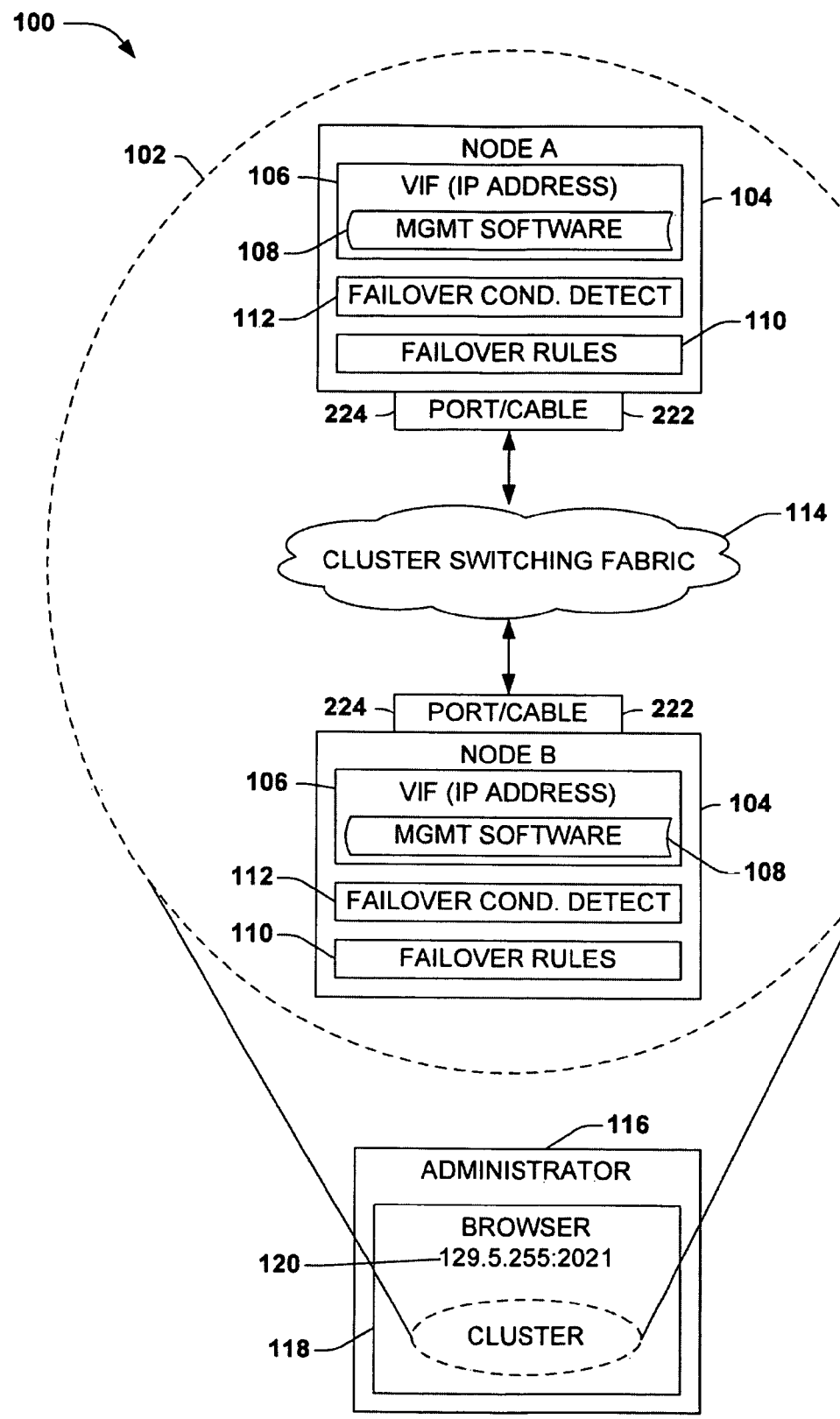
FIG. 1a is a schematic block diagram illustrating a plurality of nodes interconnected as a cluster, where a virtual interface is implemented for managing the cluster.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A virtual interface (VIF) may be used to allow a storage system administrator access to a networked storage system.

Cluster management software on the storage system (e.g., instances of cluster management software installed on one or more controllers in a cluster of controllers) may, for example, allow the administrator to manage the system virtually (e.g., as one system, even though the system may be a cluster of individual controllers). However, if the administrator uses a VIF restricted to a single controller, for example, in a cluster of controllers in a storage system, and communication to that "VIF controller" is lost, the administrator may not be able to virtually manage the storage system until access is restored (e.g., another VIF access point is discovered and a connection is made). On-the-other-hand, a VIF failover, for example, may provide automated migration of VIF hosting duties from a failed port on a node to another port, or from a failed node to another node in a cluster of nodes in the system. In this example, the VIF failover can have failover rules that determine how a failover is handled, can detect a failover condition, and automatically migrate the VIF hosting duties. Further, a VIF failover may be able to automatically adjust failover rules in accordance with events in the system, for example, when a new node is added or dropped out. In this way, the administrator may have seamless access to manage the storage system, even during conditions where, for example, a node loses communication with the rest of the system.

Embodiments described herein relate to techniques and systems for a virtual interface (VIF) failover scheme that allows an administrator to manage a cluster of data storage components as a single entity, and that substantially automatically migrates VIF hosting upon a failover condition.

FIG. 1a is a schematic block diagram illustrating an example of virtual cluster storage system administration 100. The example 100 illustrates an exemplary cluster 102 of data storage devices 104 where a virtual interface (VIF) 106 is implemented for managing the cluster 102. As an example, a cluster 102 may comprise two or more storage controllers 104, interconnected by a cluster switching fabric 114 (e.g., a Fibre Channel connection). In the example illustrated, respective storage controllers or nodes 104 have cluster management software 108 installed thereon, which may be accessed through the VIF 106. It will be appreciated that any number of nodes within a cluster (including less than all) may have such cluster management installed thereon to facilitate (remote) management of the cluster and the nodes contained therein. Further, different nodes in the cluster may have different versions of such management software installed thereon, where the different versions may be more or less robust. For example, a streamlined or stripped down version of the software may be installed on one node and may rely on another more sophisticated version of the software installed on a different node for operation. Likewise, a less robust version of the software may allow the node upon which it is installed to be managed (remotely) by an administrator, but it may not have the capabilities to support a management interface that allows an administrator to manage the entire cluster (remotely) through this node. Further, a node in the cluster may have little to no management software installed thereon, but may be able to be managed (remotely) by an administrator by having an instantiation of (a more sophisticated version of) management software running or executing thereon, where the (more sophisticated version of the) management software is actually installed on a different node in the cluster, for example.

The administrator 116, wishing to access the cluster storage system to perform system management tasks, may access the duster 102, for example, by using a browser 118 (e.g., installed on a client device) and inputting an Internet protocol (IP) address 120 specified for the VIF 106. A controller 104 in the cluster 102, which may be designated as a host of the VIF access point 106 for the management software 108, can allow the administrator 116 to use the management software 108 virtually to perform management tasks on the cluster 102.

If a node 104 that is hosting the VIF 106 becomes disconnected from the cluster (e.g., a communications cable 222 becomes unplugged or other "hard" failure) or becomes unable to adequately host the VIF 106 (e.g., a port 224 becomes unavailable for hosting an IP address or other "soft" failure), the VIF 106 may become unavailable to the administrator 116 using the browser 118 to access the management software 108. In this example, an administrator may be without system management capabilities until a new connection can be discovered and connected.

The change in status of a node being able to host the VIF 106 to a node that is unable to host the VIF is generally referred to as a failover condition herein. In the illustrated example, the nodes 104 of the cluster 102 comprise failover condition detector components 112 that facilitate determining when a failover condition occurs. For example, the failover condition detector components 112 may comprise circuitry that detects when a cable becomes unplugged (e.g., hard failure) and/or when a port becomes unavailable (soft failure). When a failover condition is detected, the corresponding failover condition detector component 112 can cause the failed controller to publish a "failed condition" alert, for example, to the other controllers in the cluster, and failover rules 110 in the respective nodes 104 can determine which of the remaining nodes can host the VIF 106. In this way, an administrator 116 using a browser 118 to access the management software 108 can have a substantially seamless VIF experience if a controller that is hosting the VIF 106 "goes down."

It will be appreciated, that while exemplary embodiments, described herein, described clusters as comprising two or more node components, the methods and systems described herein are not limited to two or more nodes. The failover methods and systems, described herein may be utilized by a single controller, filer, or node (or other type of VIF hosting component), comprising two or more ports, for example, that can perform VIF hosting duties. In this embodiment, if a failover condition occurs, for example, the VIF hosting may be migrated from a "failed" port to another port on the node that is capable of hosting the VIF. At times, these different items or components that host (or are capable of or configured to host) a VIF are merely referred to as hosting components herein. Moreover, reference herein to one type of hosting component is generally intended to comprise other types of hosting components as well. For example, discussion, description, explanation, etc. relative to a node is generally intended to be equally applicable to a port.

Figure 1B:
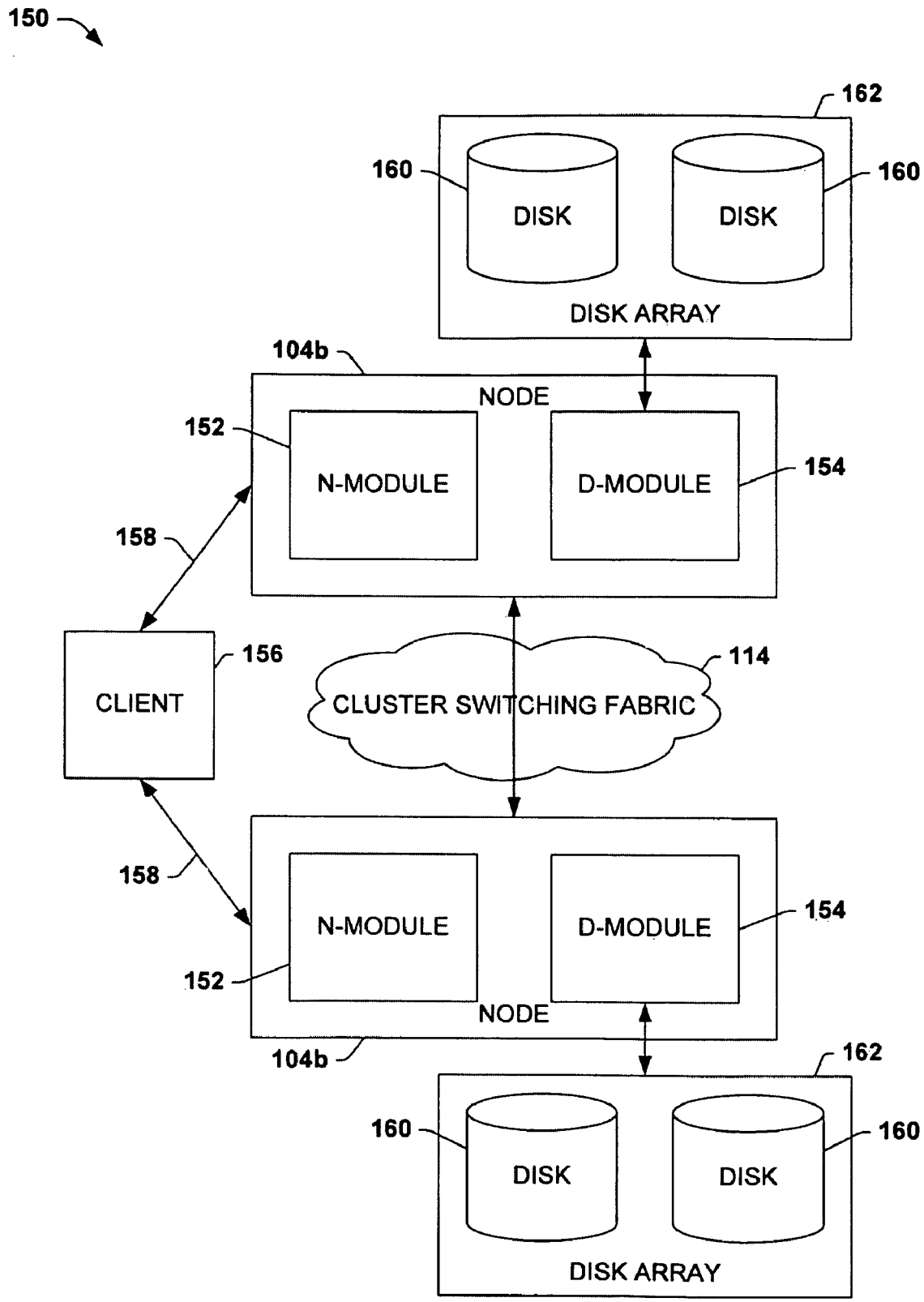
FIG. 1b is another schematic block diagram illustrating a plurality of nodes interconnected as a cluster, where a virtual interface may be implemented for managing the cluster.

FIG. 1b is a schematic block diagram illustrating an exemplary cluster environment 150 of interconnected nodes 104b configured to provide data storage services, wherein a virtual user interface failover scheme as provided herein can be implemented. The respective nodes 104b generally comprise, among other things, a network element 152 (N-Module) and a disk element 154 (D-Module), where at least some of these elements 152, 154 may be comprised within memory of a node. The disk elements 154 in the illustrated example are coupled to one or more storage devices, such as disks 160 of a disk array 162. Such disks 160 may implement data storage on any suitable type of storage media, such as optical, magnetic; electronic and/or electro-mechanical storage devices, for example. It will be appreciated that while there are an equal number of network 152 and disk 154 modules depicted in the illustrated example, there may be differing numbers of these elements. For example, there may not be a one-to-one correspondence between the network 152 and disk 154 modules in the different nodes 104*b*. Similarly, while merely two nodes 104*b* are illustrated in the example depicted in FIG. 1*b*, such a cluster 150 can comprise any suitable number of nodes to provide desired storage services (e.g., n nodes, where n is a positive integer).

The disk elements 154 are configured to facilitate accessing data on the disks 160 of the arrays 162, while the network elements 152 are configured to facilitate connection to one or more client devices 156 (e.g., one or more general purpose computers) as well as interconnection between different nodes. Connection to one or more clients 156 may occur via an Ethernet and/or Fibre Channel (FC) computer network 158, for example, while interconnection between different nodes may occur via a cluster switching fabric 114 (e.g., a Gigabit Ethernet switch). An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published. Aug. 22, 2002.

The exemplary cluster 150 is one example of an embodiment where the techniques and systems, described herein, can reside. In this embodiment, the modules 152 and 154 can communicate with a distributed transactional database (DTDB), for example, stored in the disk array 162 of respective nodes 104*b* in the cluster 150. In this example, the modules 152 and 154 may be used to coordinate communication with instances of the DTDB on respective nodes 102 in the cluster 150. Having DTDB arranged and managed in this manner, for example, may facilitate consistency of information regarding respective multiple components, and data stored on multiple disks 160, contained in the cluster 150. It will be appreciated that components, features, elements, etc. described herein that have functionalities and/or aspects related to accessing data may be comprised within and/or comprise one or more disk elements 154. Similarly, components, features, elements, etc. described herein that have functionalities and/or aspects related to networking and/or communications may be comprised within and/or comprise one or more network elements 152. It will also be appreciated that such N and D modules are commercially available from NetApp, Inc. of Sunnyvale, Calif.

Figure 2:
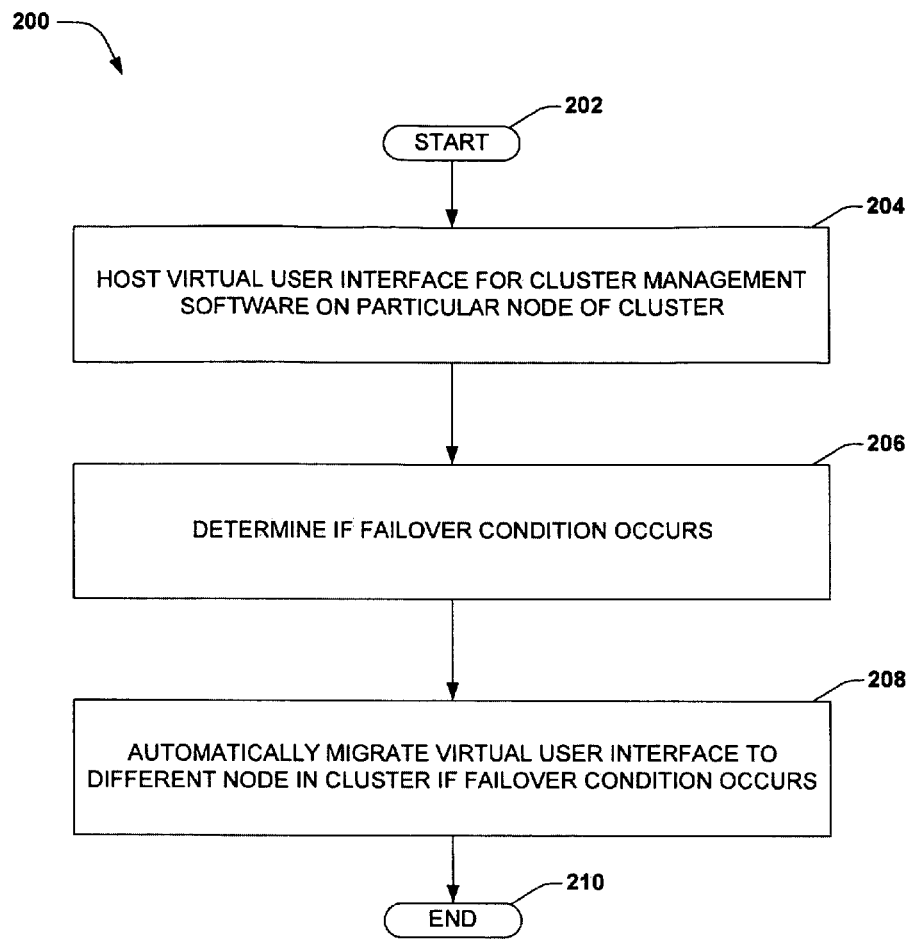
FIG. 2 is a flow diagram illustrating an exemplary method for managing a cluster of data storage devices using VIF failover technique.

FIG. 2 is a flow diagram illustrating an exemplary method 200 for managing a cluster of data storage devices using one or more VIF failover techniques. After initialization at 202, the exemplary method 200 involves hosting a virtual user interface (VIF) on a particular node of a cluster for accessing cluster management software at 204. At 206, the exemplary method determines whether a failover condition occurs (e.g., a VIF hosting node becomes unavailable or is not longer able to effectively host the VIF). At 208, if a failover condition occurs, the exemplary method 200 automatically migrates a hosting of the virtual user interface to a different node in the cluster (e.g., VIF hosting migrates from a "failed" node to another node that is able to host the VIF). Having migrated the VIF hosting so that an administrator can continue to virtually and remotely manage the cluster, the exemplary method 200 ends at 210.

In one aspect, detecting when a node in a cluster is unavailable or unable to effectively host the VIF can be handled by a distributed transactional database (DTDB). This may, for example, correspond to a failover condition detector component 112 as illustrated in FIG. 1. As an example, a storage system comprising two or more nodes (e.g., storage controllers) in a cluster may have an instance of a DTDB (e.g., a replication database (RDB)) running on respective disparate nodes. The DTDBs on the respective nodes can stay substantially in constant contact with each other, updating cluster events (e.g., file writes, file access, hierarchy rules, list of failover rules, etc.) and detecting communication issues. In this example, because the DTDBs running on respective nodes in the cluster are in substantially constant communication, an interruption in this communication from one node may be an indication to other nodes in the cluster that the affected node is unavailable (e.g., offline), at least for purposes of hosting the VIF. Further, if a physical link to a node's hardware in the cluster is severed (e.g., a cable becomes unplugged), the cluster management software could detect the communication interruption and publish this information to the other nodes in the cluster.

In this aspect, for example, if it is determined that a node hosting the VIF for the cluster management software has become unavailable or unable to effectively host the VIF, this can trigger a failover action. As alluded to above, a failover condition may occur when communication between the node hosting the VIF and one or more other nodes in the cluster becomes unreliable (e.g., the hosting node does not have the ability to stay in substantially constant contact with the other nodes in the cluster), which may be called a "soft" failover condition. A failover condition may also occur when hardware associated with the node that is hosting the VIF sustains a failure and is unable to communicate with the other nodes in the cluster (e.g., a network cable becomes unplugged, a partial power failure, a complete failure of the node), which may be called a "hard" failover condition. A hard failover condition may generally be regarded as a condition that results in a loss of an ability for cluster management software to communicate with a node in the cluster; and a soft failover condition may generally be regarded as a condition that results in a loss of an ability for a node in the cluster to host a virtual user interface. In this example, when either a soft or hard failover condition is detected, a VIF hosting migration may be triggered, causing the VIF to be (automatically) moved to a different node in the cluster that has the ability to host the VIF effectively.

Figure 3:
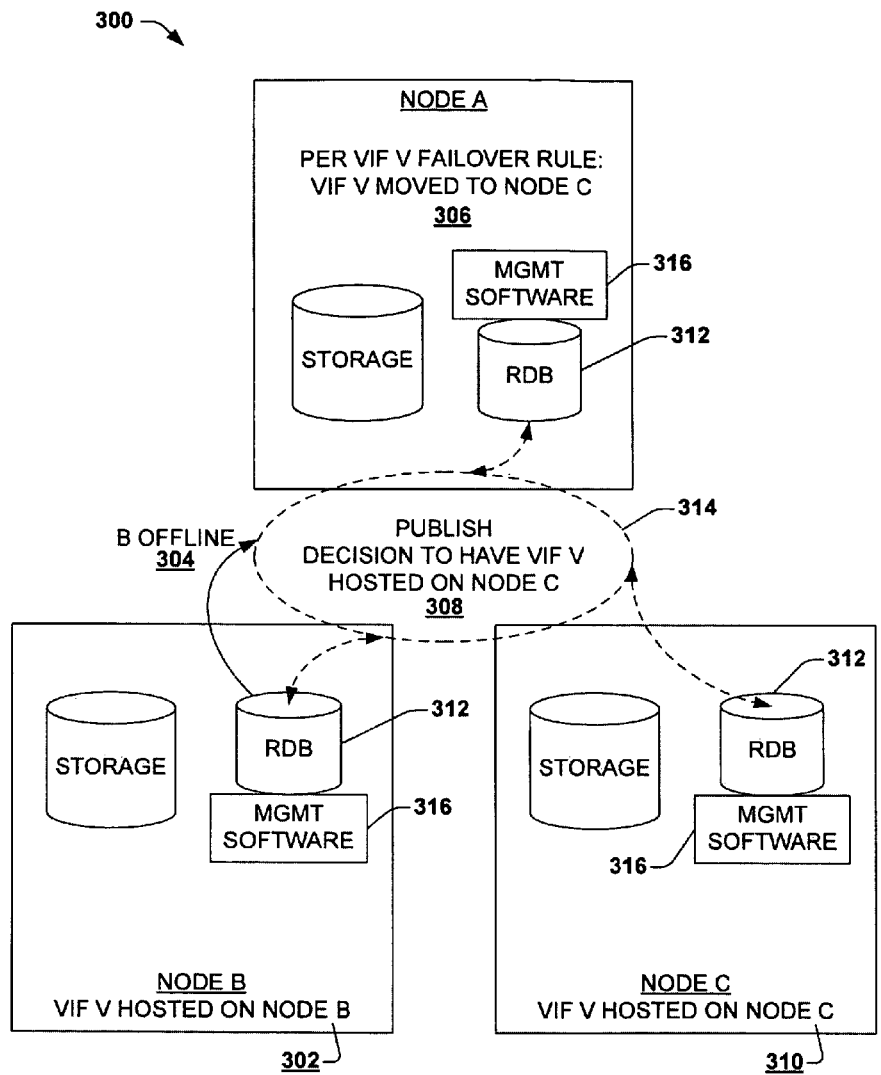
FIG. 3 is a schematic block diagram illustrating an exemplary VIF failover process for a disabled node in a 3-node cluster.

FIG. 3 is a schematic block diagram illustrating an exemplary VIF failover process for a disabled node in a 3-node cluster 300. In this example, respective nodes A, B, C in the 3-node cluster have an instance of a DTDB 312 running thereon along cluster management software 316. In this example, initially, node B hosts VIF V at 302. When, node B "fails" (e.g., either a soft or hard failover condition occurs) respective coordinators on the different nodes, such as may be comprised within respective replication databases 312, receive a "B offline" event notification at 304 through the cluster's communication channel 314 (e.g., network connection, Fibre Channel, etc.). A coordinator in node A applies a failover rule for VIF V and concludes at 306 that VIF V should be hosted on healthy node C. The decision to host VIF V on node C is published to the different nodes in the cluster at 308, using the cluster's communication channel 314. The VIF manager instance, on node C accepts the new hosting rule and takes ownership of VIF V at 310.

Figure 4:
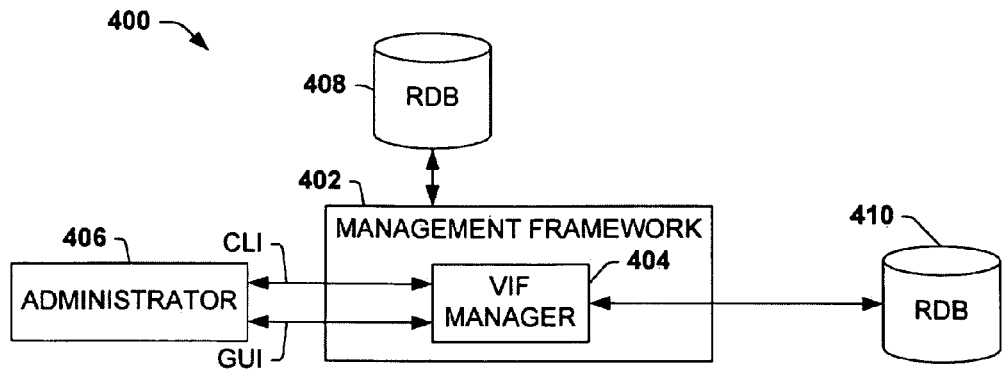
FIG. 4 is a schematic block diagram illustrating an exemplary collection of management processes that execute as user mode applications on a node of a cluster to facilitate cluster management.

FIG. 4 is a schematic block diagram illustrating an exemplary collection of management processes that execute as user mode applications 400 on an operating system of a node to provide management of nodes of a cluster. In this example, the management processes comprise a management framework process 402, and a virtual interface (VIF) manager 404, utilizing respective data replication services (e.g., distributed replication databases) DTDB 408, DTDB 410.

The management framework 402, among other things, provides a user interface to an administrator 406 via a command line interface (CLI) and/or a network-based (e.g., Web-based) graphical user interface (GUI), for example. It will be appreciated, however, that other user interfaces and protocols may be provided as devised by those skilled in the art. For example, management APIs, such as Simple Network Management Protocol (SNMP) and/or SOAP (e.g., a protocol for exchanging XML-based messages, such as remote procedure calls, normally using HTTP/HTTPS) may be used to provide a user interface to the administrator 406. The management framework 402 may be based on a common interface model (CIM) object manager, for example, that provides the entity to which users/system administrators interact with a node to manage a cluster. The VIF manager 404 is configured to use an agreement between quorum participants in a cluster to coordinate virtual interfaces hosted on nodes of a cluster.

Figure 5:
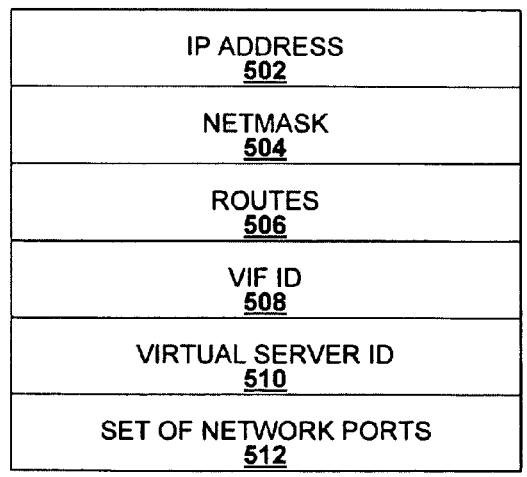
FIG. 5 is a stack diagram illustrating an exemplary virtual interface (VIF) data structure.

FIG. 5 is a stack diagram illustrating an exemplary virtual interface (VIF) 500 data structure. The VIF 500 comprises an address 502 (e.g., an IP address), netmask 504, routes 506, VIF ID 508, virtual server ID 510 and a set of network ports 512 where the VIF may be hosted. There are generally three types of VIFs: data VIFs, cluster VIFs, and management VIFs. Data VIFs are configured on ports facing a client or on a "client facing network" (e.g., ports on a network interface card (NIC) of a network adapter) for data access via NFS and CIFS protocols, for example. Cluster VIFs and management VIFs can be configured, for example, on ports facing other nodes of a cluster (e.g., ports on an access adaptor). It will be noted that the embodiments described herein typically utilizes management VIFs.

Referring back to FIG. 4, the VIF manager 404 may be configured to cause a VIF to switch over to a different node (e.g., to failover) where, for example, a network port failure, network interface failure, cable failure; switch port failure and/or other type of node failure occurs. The VIF is at most, however, hosted by one node at time, including during a failover process. The VIF manager 404 is generally responsible for enabling, configuring, activating, monitoring and/or failing over the management VIF. In this example, during boot, the VIF manager 404 is initiated by the management framework 402. A discovery mechanism of the management framework 402 discovers devices (e.g., other nodes) managed by a network module of the node, as well as other devices on the node. The management framework 402 queries and configures respective network interfaces (e.g., NICs) of different devices (e.g., nodes) managed by the network module of the node. The VIF manager 404 can store information needed to manage these ports and/or network interfaces, for example, in the DTDB 410.

In another aspect, the VIF manager 404 generally causes a failover to occur, when a failover condition is detected, according to one or more associated failover rules, such as by attempting to failover to a node in a predetermined order, for example, where a first node in such a rule is considered the home node. The VIF manager 404 can also redirect a VIF back to its home node (e.g., a node that hosts the VIF at initiation of VIF management) as long as that node is active. By way of further example, a default failover rule can be that no failover is enabled. VIF failover rules can be established and edited by a system administrator, automatically, as nodes are added to the cluster, etc.

Two examples of failover rules for node selection are "priority-order rule" and "next-available rule." According to the priority-order rule, when a node fails (e.g., a soft or hard failover condition), a VIF moves to the highest priority available node in the cluster (home node if available). By providing unique priorities, the priority of a node can be specified within the rule. According to the next-available rule, when a node fails, a VIF moves to the next available node in the rule (home node if available).

It will be appreciated that an instance of the VIF manager 404 runs on the respective nodes in a cluster. The respective VIF manager instances can use a DTDB to store configuration information and use a DTDB quorum mechanism to determine a node's suitability for VIF hosting. The DTDB can also serve as a mechanism for signaling other nodes when they have been configured to host a VIF (e.g., 308, FIG. 3). One instance of the VIF manager can be designated as a failover coordinator (e.g., Node A in FIG. 3). The coordinator is co-located, for example, on a node with a DTDB master. In this example, the coordinator is responsible for reassigning the VIFs of nodes that are unavailable. The other respective instances (secondaries) of the VIF manager in a cluster can be responsible for reassigning VIFs upon failover conditions. The coordinator can also perform functions of a secondary with respect to its local node. In one example, a coordinator publishes new configurations (e.g., 308, FIG. 3), and if for some reason a particular node (e.g., an unhealthy node) can not fulfill requirements of a newly published configuration, then a secondary transaction is invoked by the unhealthy node to republish a second (failover) configuration.

In embodiments described above (and below), as an example, failover rules can be stored, accessed, updated, and/or managed using instances of a distributed transactional database (DTDB) system (e.g. a replication database (RDB)) running on components of a storage system. However, it will be appreciated that, failover rules may be stored, accessed, updated and/or managed using a variety of hardware, firmware and/or software, comprising a variety of components on a storage system configured for virtual management.

Figure 6:
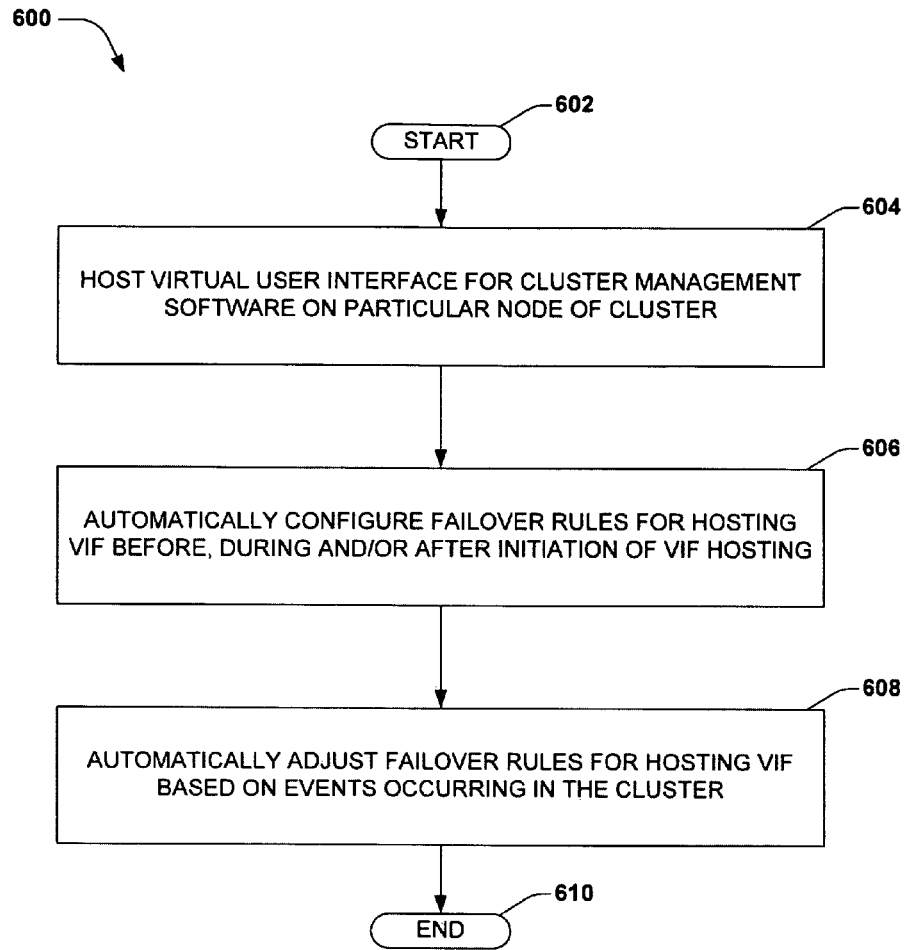
FIG. 6 is a flow diagram illustrating an exemplary VIF failover technique.

In one embodiment, a technique for managing a cluster of data storage devices may comprise hosting a VIF for cluster management by automatically configuring failover rules for the VIF as a function of (e.g., before, during and/or after) the initiation of hosting of the VIF. That is, in addition to having pre-established failover rules, such rules can also be automatically adjusted based on events occurring in the cluster to update failover rule lists, for example. Failover rule lists may be updated or computed, for example, when nodes and/or ports are added to and/or removed from the cluster. That is, when a change in the cluster occurs, the available ports that can host the VIF are determined, and depending on where the home port is for a VIF, for example, an individual customized list of failover rules for that VIF can be determined and propagated to the available hosting devices in the cluster. FIG. 6 is a flow diagram illustrating an exemplary method 600 for managing a cluster of storage devices by hosting a VIF.

The exemplary method 600 begins at 602 and involves hosting a VIF on a particular node of a cluster (e.g., a home node), for accessing cluster management software (e.g., VIF manager) at 604. At 606, before, during and/or after the initiation of VIF hosting (e.g., during system boot, the VIF manager is initiated by a management framework, which, in turn, initiates hosting of the VIF on a node in the cluster), the failover rules are configured for hosting the VIF in the cluster (e.g., failover rules are configured based on the number of healthy nodes present, the configuration of the nodes, and/or other assignments based on predetermined settings). At 608, when events occur in the cluster (e.g., a node goes down, a node is added, etc.), the exemplary method 600 automatically adjusts the failover rules for hosting the VIF to accommodate the event(s) (e.g., creating a new'list of failover rules and/or hierarchical schedule for VIF hosting based on number and configuration of healthy nodes).

In this embodiment, an administrator may provide initial settings for a failover coordinator prior to starting a system or during an administrative task. As an example, initial settings may assign a list of failover rules and/or node failover schedule hierarchy based on a record of reliability of the respective nodes (e.g., nodes that have maintained stable communication longest have a higher order of failover preference in a node failover schedule). As another example, the initial settings may assign a list of failover rules and/or node failover schedule hierarchy based on runtime age of a node (e.g., older nodes may be assigned lower on a list or a lower schedule hierarchy than newer nodes, that possibly have newer components which may be more reliable and/or have enhanced capabilities (e.g., with regard to processing speeds, memory capacities, backup safety features, etc.)). Further, node failover schedules may be assigned randomly, while using the home node as the preferred failover node.

Additionally, in this embodiment, automatic adjustment of failover rules for VIF hosting can be predetermined by the system based on a cluster configuration, and may be automatically adjusted based on particular events. As an example, if a new node is added to the cluster, the system can automatically associate appropriate ports from the new node into the cluster management software, such that a VIF manager can maintain a list of potential failover targets for the VIF. Also, upon hosting the VIF on a particular node of the cluster, the system can automatically create a list of failover rules for the VIF based on a preferred home location and a current list of potential failover targets for the VIF, such that the VIF can potentially be hosted on one of any failover targets in the cluster for the VIF. Further, a failover coordinator may assign different failover rules and/or failover hierarchies to respective nodes (returning to the cluster) depending of if they were previously involved in a soft failover condition or a hard failover condition, for example. It will, nevertheless, be appreciated that numerous variations of failover settings, rules, and adjustments may be devised by those skilled in the art; and that the embodiments, described herein, are not intended to limit the variety or configuration of particular failover rules, settings, and adjustments contemplated.

In another aspect, hosting the VIF on a node of the cluster and migrating the VIF hosting, for example, may involve utilizing a VIF manager coupled to cluster management software. In this embodiment, cluster management software or an instance thereof can be installed on respective nodes in the cluster (e.g., 108, FIG. 1). Similarly, a VIF manager or an instance thereof can also be installed on respective nodes in the cluster (e.g., 404, FIG. 4). In this example, one of the nodes, and the corresponding VIF manager, can be designated as the failover coordinator (e.g., Node A, FIG. 3), and will be responsible for initially designating VIF hosting, and coordinating failover rule initiation and adjustment.

Figure 7:
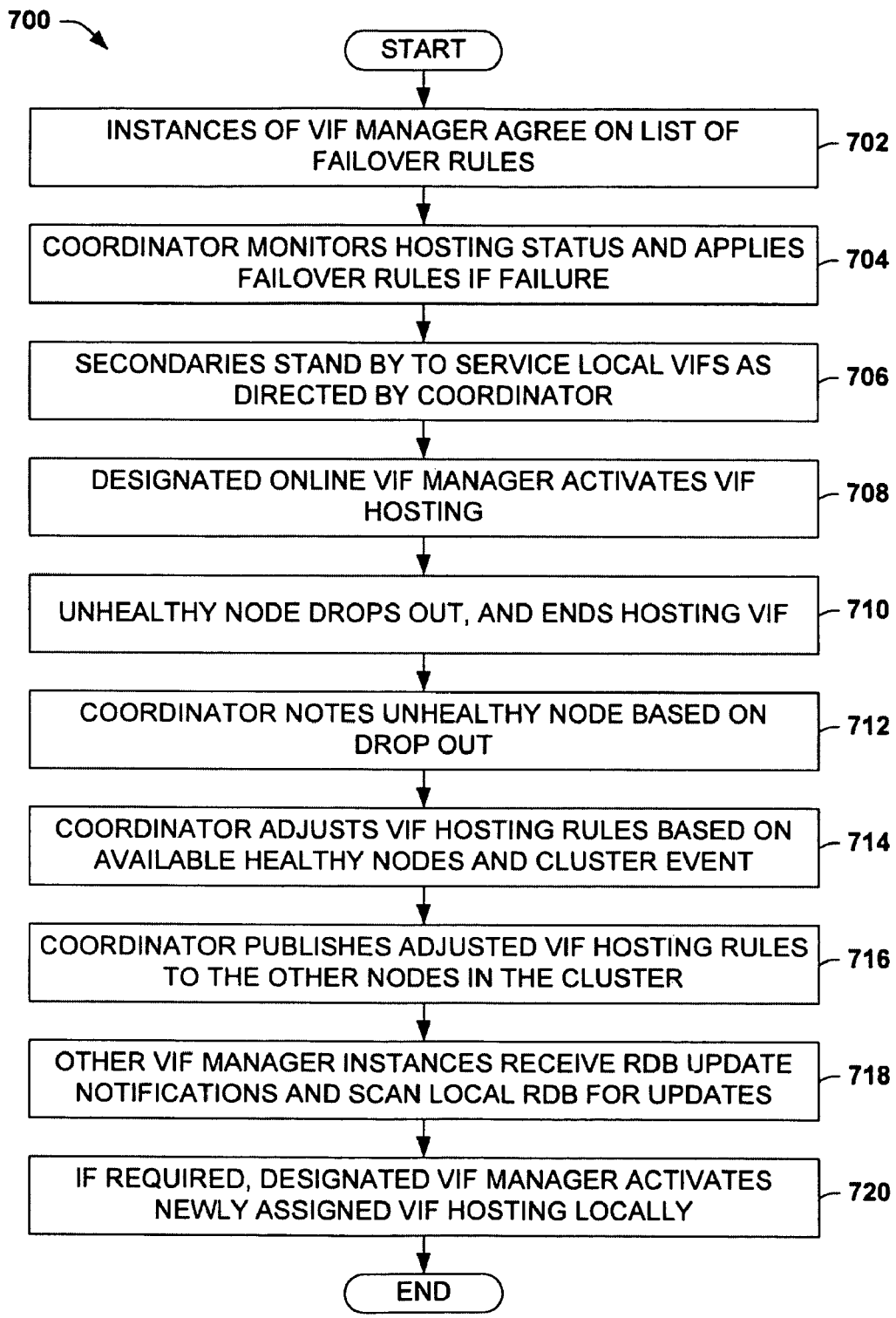
FIG. 7 is a flow diagram illustrating an exemplary VIF failover technique utilizing VIF managers.

FIG. 7 is a flow diagram illustrating an exemplary VIF failover methodology 700, utilizing VIF managers. After startup, at 702 instances of a VIF manager (on different nodes in a cluster) agree on a list of failover rules (e.g., by communicating through the respective instances of the DTDBs on the different nodes of the cluster). The VIF manager instances have access to a list of current VIF location assignments (e.g., stored by the DTDBs). At 704, a VIF manager running on a master node performs the role of coordinator by monitoring overall hosting status and applying the failover rules in response to failover conditions (e.g., hard or soft failover conditions). At 706, secondary instances of the VIF manager stand ready to perform services on their local nodes as directed by the coordinator.

The designated online VIF manager (e.g., called by the failover rules) activates VIF hosting on its respective node at 708, and at 710, when an individual node drops out of the cluster (e.g., an instance of a DTDB on the respective node drops out of communication/quorum), it ceases to host the VIF (e.g., after a suitable delay for hiccup avoidance in CIFS protocol). At 712, the VIF manager running on a master node (acting as coordinator) notes the unhealthy node based on the dropout (e.g., resulting from notification from the DTDB in the node), and adjusts the VIF hosting rules at 714 (e.g., after a hiccup avoidance delay) based on available healthy nodes and the cluster event that initiated the failover condition. At 716, the coordinator then publishes changes to the VIF hosting assignment (e.g., using the DTDB in the node to communicate changes via the networked cluster). For example, the coordinator can open a single RW transaction of the DTDB including operations which write an updated VIF assignment table to replicated databases on respective nodes of a cluster, which in turn notifies the VIF manager instances that an update has occurred. At 718, other VIF manager instances wake up in response to DTDB update notifications, and scan their local DTDBs to identify the adjusted hosting responsibilities. The newly designated VIF manager, if any, activates VIF hosting on its local node at 720, and then the method ends. It will be appreciated that the failover procedure merely requires a single RW transaction for the set of VIFs that failover, and that hosting the VIFs in response to published changes does not require additional transactional resources.

In one example of this embodiment, when the VIF manager running on a master node (acting as coordinator) assigns VIF-hosting responsibility to another node, that other node's VIF manager either honors or reassigns the responsibility. On occasion, some local error may prevent a VIF manager instance from activating VIF hosting. When this occurs, the affected VIF manager instance can recognize the error, reapply the failover rule for the VIFs that it cannot host, and then publish the new hosting rules to the cluster—just as the coordinator originally had. The different VIF manager instances share the replicated failover rule set, so each is capable of publishing new hosting rules.

Figure 8:
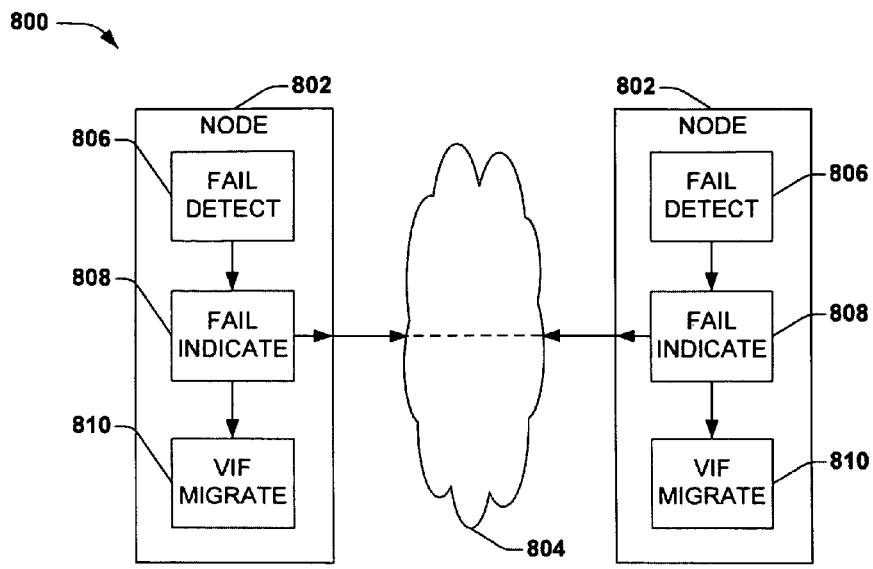
FIG. 8 is a schematic block diagram illustrating an exemplary system that may be used to host a VIF as provided herein.

In another aspect, a system may be devised for hosting a virtual user interface (VIF) for cluster management software on a cluster of data storage devices. FIG. 8 is a schematic block diagram illustrating an exemplary system 800 that may be used to host a VIF, as provided herein. The exemplary system 800 comprises two nodes 802 (e.g., storage controllers in a storage system cluster) connected in a cluster through a network fabric 804 (e.g., private network system connections, such as using Fibre Channel). The respective nodes 802 are configured to host the VIF for the cluster management software. It will be appreciated, that while the exemplary system 800 illustrates two nodes, the exemplary system may be configured with more than two nodes connected in a cluster in a variety of configurations.

Respective nodes 802 in the exemplary system 800 comprise a failover detection component 806, configured to detect a failover condition for its node 802. Further, respective nodes 802 comprise a failover indicator component 808, configured to communicate the failover condition (e.g., as detected by the failover detection component 806) to other nodes 802 in the cluster 800. Additionally, the respective nodes 802 comprise an automated VIF migration component 810, configured to migrate the VIF hosting to a different node 802 in the cluster after a failover condition is indicated (e.g., as indicated by the failover indication component 808). It will be appreciated, that while the exemplary system 800 illustrates the failover detector 806, failover indicator 808, and VIF migration component 810 as comprised within a respective node 802, these components may be arranged in other locations in the cluster in accordance with other variations developed by those skilled in the art.

In one embodiment of the system described above, for example, an instance of a distributed transaction database (DTDB) (e.g., a replication database (RDB)) may be located on respective nodes in a cluster, and these DTDBs can be used by the cluster system to communicate between respective nodes in the cluster. In this embodiment, the respective DTDBs can comprise a failover detector, which can detect when a DTDB on a node in the cluster is no longer communicating effectively. Further, in this embodiment, the cluster management software or an instance thereof can be installed on top of (e.g., operably coupled to) the respective DTDBs in the respective nodes. The cluster management software can have a VIF management component that is used to manage VIF hosting (e.g., provide virtual online user access to the cluster management software). In this embodiment, the failover indicator 808 and VIF migration 810 components can be managed by the respective VIF managers in the respective nodes in the cluster.

Figure 9:
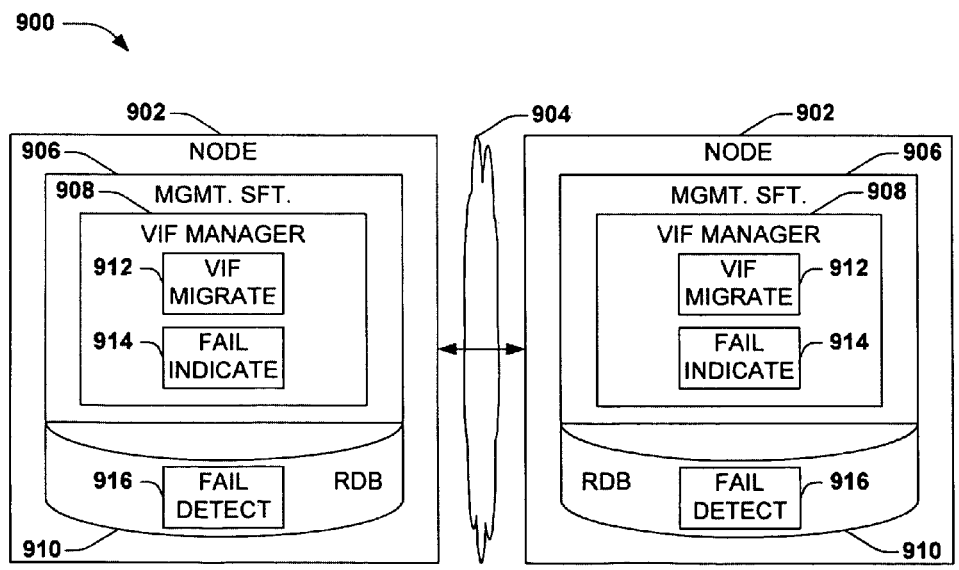
FIG. 9 is a schematic block diagram illustrating an exemplary system that may be used to host a VIF as provided herein.

FIG. 9 is a schematic block diagram illustrating an exemplary system 900 that may be used to host a VIF. The system is similar to that illustrated in FIG. 8, but illustrates more details. The exemplary system 900 contains two nodes 902 (but more can be included) to form a cluster connected by a network 904 (e.g., Fibre Channel). Respective nodes 902 in the cluster 900 have instances of a DTDB 910, which is used to communicate between the nodes 902 in the cluster. In this example, a failover detection component 916 is located on the DTDB 910, as respective DTDBs may be the first to detect a communication problem within the cluster. Respective DTDBs 910 in the different nodes 902 are operably coupled with cluster management software 906 or an instance thereof installed on the respective nodes 902.

In the exemplary system 900, respective nodes comprise a VIF management component 908, operably coupled with the cluster management software 906. In this example, the VIF management component 908 may be used to manage the VIF, and comprises: a failover indicator 914 for communicating a failover condition (e.g., based on settings in the VIF manager 908) to the other nodes 902 in the cluster; and a VIF migration component 912, used to move VIF hosting to a different node (e.g., based on setting in the VIF manager 908) after a failover condition is detected and indicated.

Figure 10:
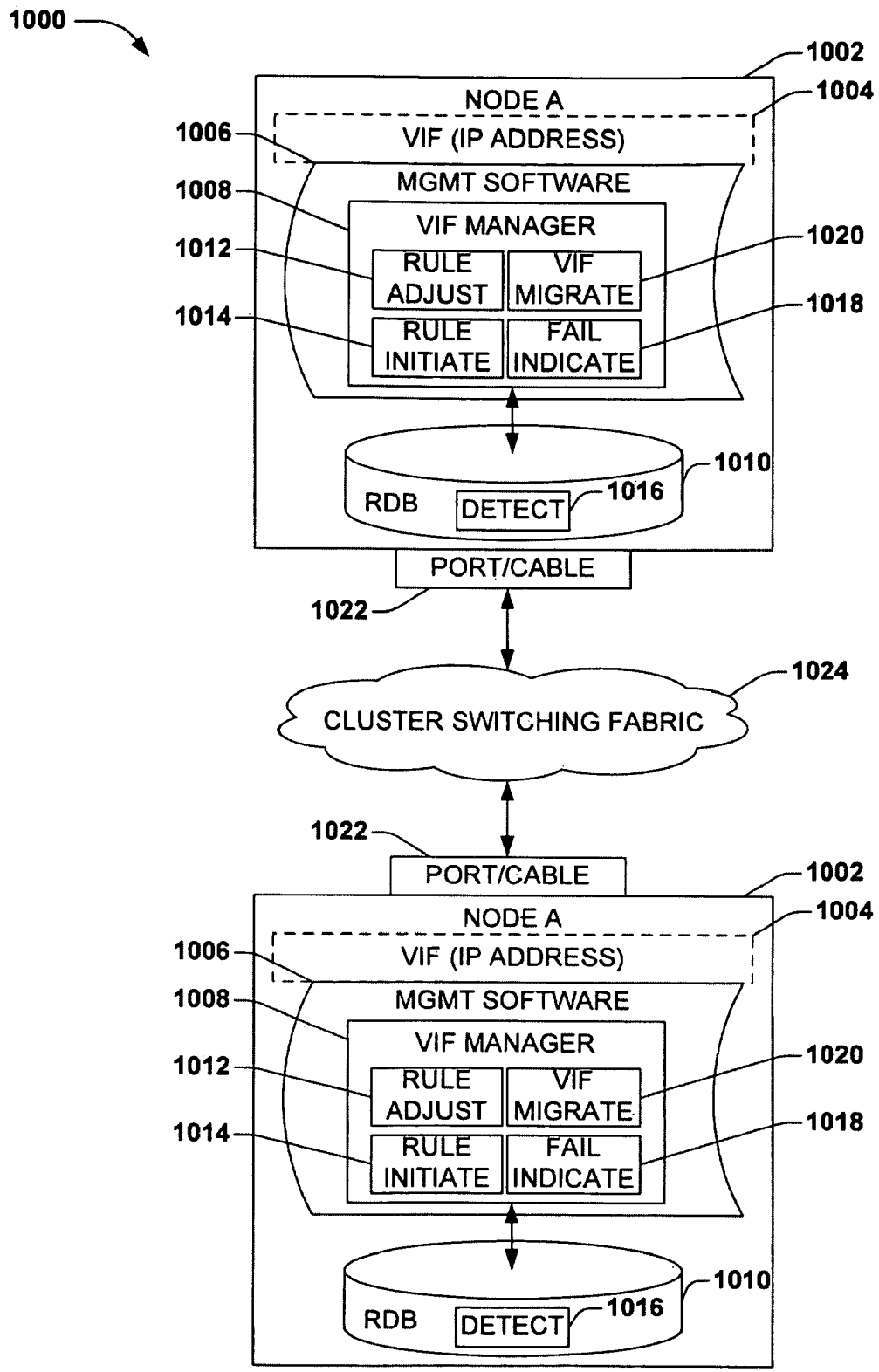
FIG. 10 is a schematic block diagram illustrating an exemplary system for hosting a VIF for cluster management software on a cluster of data storage devices.

In another aspect, a system may be devised to host a virtual user interface (VIF) for cluster management software, comprising at least two nodes, which can automatically organize and adjust failover rules based on events in the cluster. FIG. 10 is a block diagram of an exemplary system 1000 for hosting a VIF for cluster management software on a cluster of data storage devices. The exemplary system 1000 comprises two nodes 1002 (node A and node B, but any number of nodes may be included in a cluster) connected by communication ports 1022 through cluster switching fabric 1024. It will be appreciated that the exemplary system described herein may contain more nodes, may be connected in other ways, and may use various configurations as devised by those skilled in the art. Nevertheless, respective nodes 1002 comprise a failover rule initiator 1014 configured to automatically organize failover rules for hosting a VIF 1004 at an initiation of the hosting of the VIF 1004 in the system 1000; and a failover rule adjuster 1012 configured to automatically adjust the failover rules for hosting the VIF based on events occurring in the cluster 1000. In this example, both the rule initiator 1014 and the rule adjuster 1012 are comprised in a VIF manager 1008, along with a failover indicator 1018, and a VIF migration component 1020. Further, in this exemplary system 1000, the VIF manager 1008 is comprised within cluster management software 1006 or an instance thereof on the respective nodes 1002. Respective instances of the cluster management software 1006 are operably coupled to an instance of a distributed transactional database (DTDB) (e.g., a replication database (RDB)) 1010, which comprises a failover detection component 1016.

At boot of the exemplary system 1000, the cluster management software 1006 can initiate the VIF manager 1008, which in turn operates the failover rule initiator component 1014, which organizes the failover rules for the system, for example, based on the configuration of the system (e.g., how many healthy nodes are present, coordinator/home node present). In this example, if an event occurs in the cluster 1000 (e.g., a node is added, lost, failover condition occurs) the VIF manager 1008 operates the failover rule adjuster 1012 to adjust the failover rules in accordance with the events.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The illustrative embodiments described herein use the DTDB services notion of online/offline status as a proxy for general node health. The DTDB service provides online/offline notifications in response to changes in a node's health status. The DTDB service also internally maintains health information for different nodes in a cluster, and provides up-to-date aggregated cluster health information through a health monitor interface. It will be appreciated that one example of a DTDB is a replication database (RDB). A VIF manager coordinator can use the notifications to trigger failover activity, and use the aggregated health view in a decision-making algorithm. The illustrative embodiments may also use an offline state as a form of implicit message passing during network partition. An offline node relinquishes its VIF, and its online peers can know that it has done so by virtue of the fact that time has elapsed while the node is offline.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be adapted to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

The operations herein described, are exemplary and imply no particular order. Further, the operations can be used in any sequence when appropriate and can be partially used (e.g., not all actions may be necessary). It should be understood that various computer-implemented operations involving data storage may comprise manipulation of physical quantities that may take the form of electrical, magnetic, and/or optical signals capable of being stored, transferred, combined, compared and/or otherwise manipulated, for example.

Another example involves computer-readable media comprising processor-executable instructions configured to implement one or more of the techniques presented herein. Computer readable media is intended to comprise any mechanism that can store data, which can be thereafter be read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 11:
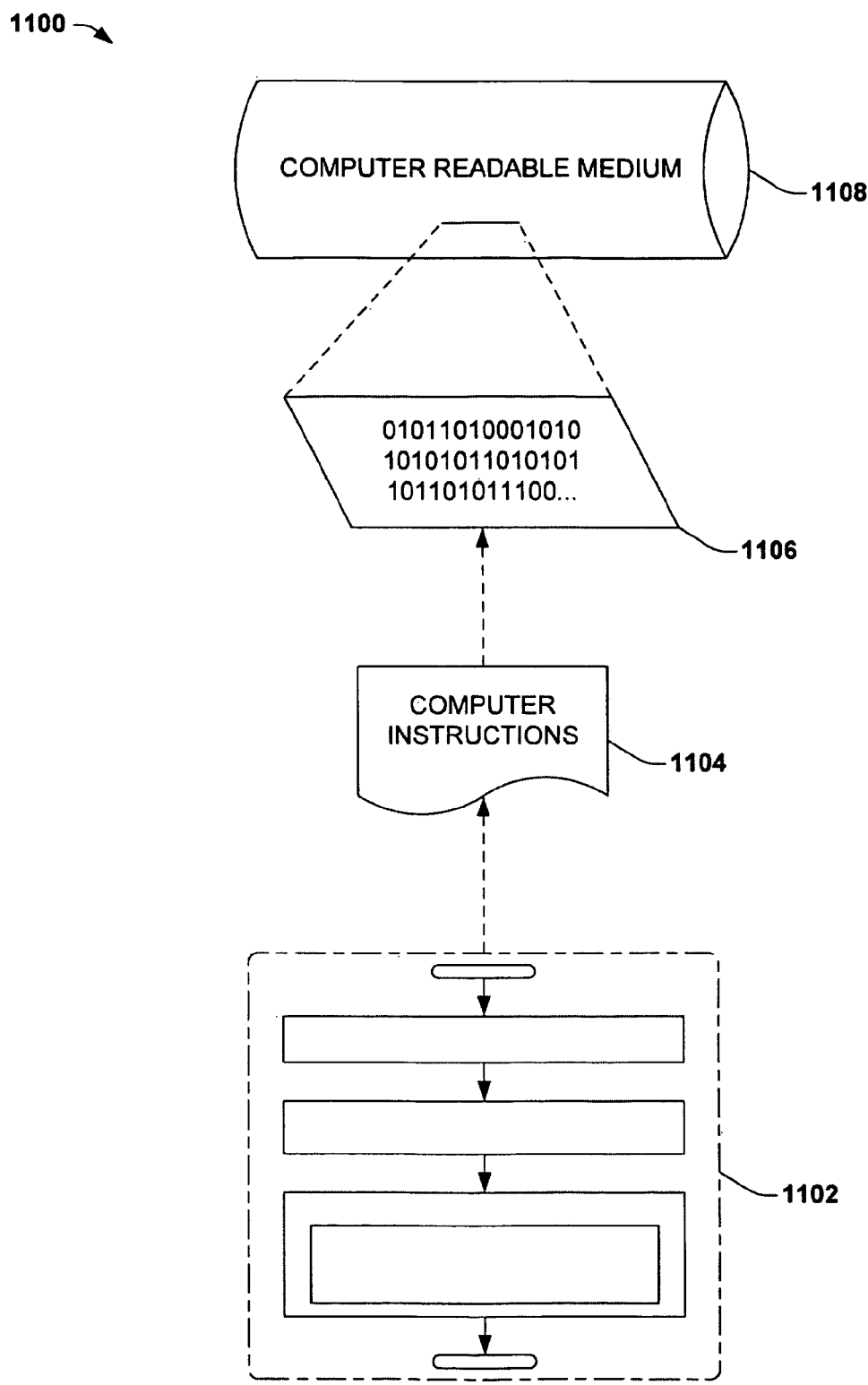
FIG. 11 is an illustration of an exemplary computer-readable medium comprising processor-executable instructions configured to embody one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, wherein the implementation 1100 comprises a computer-readable medium 1108 (e.g., a CD-R, DVD-R, or a platter of a hard disk drive), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102 for managing a cluster of data storage devices comprising a VIF, such as the method 200 of FIG. 2, for example. Many such computer-readable media may be devised by those of ordinary skill in the art that are configured to operate in accordance with the techniques presented herein.

The foregoing description has been directed to particular embodiments. It will be apparent, however, that other variations and modifications may be made to the described embodiments, with the attainment of some or all of their advantages. Specifically, it should be noted that one or more of the principles set forth herein may be implemented in non-distributed file systems. Furthermore, while this description has been written in terms of separate remote and support systems, the teachings are equally suitable to systems where the functionality of the remote and support systems are implemented in a single system. Alternately, the functions of remote and support systems may be distributed among any number of separate systems, wherein respective systems perform one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the spirit and scope of the disclosure herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the word "exemplary" is used herein to mean serving as an example, instance, or illustration. That is anything described herein as "exemplary" is not necessarily to be construed as advantageous over other aspects or designs. Also, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for managing a cluster of data storage devices, comprising:
   hosting a virtual user interface for cluster management software on a particular hosting component of the cluster, wherein the hosting component is configured to host merely a single management virtual user interface and zero or more non-management virtual user interfaces;
   determining if a failover condition occurs; and
   automatically migrating the virtual user interface hosting to a different hosting component in the cluster if a failover condition occurs.

2. The method of claim 1, hosting a virtual user interface comprising providing access to a user interface via an internet protocol (IP) address.

3. The method of claim 1, determining if a failover condition occurs comprising at least one of:
   detecting a hard failover condition; and
   detecting a soft failover condition.

4. The method of claim 1, automatically migrating comprising:
   moving the virtual user interface hosting to a different hosting component according to failover rules.

5. The method of claim 4, automatically migrating comprising:

determining a hosting component to which the virtual user interface hosting is to failover according to the failover rules when a failover condition is detected; and automatically moving the hosting of the virtual user interface to a determined hosting component.

6. The method of claim 5, comprising at least one of:

failing over to a hosting component that has been most recently added as having the ability to host the VIF; and failing over to a hosting component that has exhibited stable communication for the greatest duration.

7. The method of claim 4, comprising automatically updating the failover rules.

8. The method of claim 1, comprising, if a failover condition occurs, at least one of:

publishing a hosting component offline notification event to the cluster; and publishing to other hosting components an indication that the different hosting component in the cluster will host the virtual user interface.

9. A method for managing a cluster of data storage devices, comprising:

hosting a virtual user interface for cluster management software on a particular hosting component of the cluster;

automatically configuring failover rules for hosting the virtual user interface as a function of the hosting of the virtual user interface; and automatically adjusting the failover rules for hosting the virtual user interface.

10. The method of claim 9, adjusting the failover rules comprising:

examining respective hosting components in the cluster to determine whether the hosting component can host the virtual user interface; and developing a list of failover rules for hosting components in the cluster based on hosting components that have an ability to host the virtual user interface.

11. The method of claim 9, where the failover rules are automatically adjusted based on events occurring in the cluster, the events occurring in the cluster comprising one or more of:

adding one or more hosting components to the cluster;

removing one or more hosting components from the cluster; and an occurrence of one or more failover conditions.

12. The method of claim 11, the one or more failover conditions comprising at least one of:

a hard failover condition; and a soft failover condition.

13. A system for hosting a virtual user interface for cluster management software on a cluster of data storage devices, the system comprising:

at least two hosting components, respective hosting components configured to host the virtual user interface for the cluster management software;

a failover condition detector component configured to detect a failover condition of a hosting component in the cluster;

a failover condition indicator component configured to communicate the failover condition to one or more respective other hosting components in the cluster; and an automated virtual user interface migration component configured to migrate the virtual user interface hosting to a different hosting component in the cluster after a failover condition is indicated and configured to publish to other hosting components which hosting component will host the virtual user interface.

14. The system of claim 13, the virtual user interface comprising an access point to the cluster management software for interaction by a user.

15. The system of claim 14, the access point comprising an Internet protocol (IP) address.

16. The system of claim 13, the failover condition detector configured to at least one of:

detect a hard failover condition; and detect a soft failover condition.

17. The system of claim 13, the failover condition indicator component configured to publish a hosting component offline notification event to the cluster.

18. A system for hosting a virtual user interface for cluster management software on a cluster of data storage devices, the system comprising:

at least two hosting components, respective hosting components configured to host the virtual user interface for the cluster management software;

a failover rule initiator configured to automatically organize failover rules for hosting the virtual user interface, as a function of the hosting of the virtual user interface; and a failover rule adjuster configured to automatically adjust the failover rules for hosting the virtual user interface.

19. The system of claim 18, the failover rule adjuster configured to:

examine respective hosting components in the cluster to determine whether a hosting component can host the virtual user interface; and develop a list of failover rules for hosting components in the cluster based on hosting components that have an ability to host the virtual user interface.

20. A method for managing a cluster of data storage devices, comprising:

hosting a virtual user interface for cluster management software on a particular hosting component of the cluster, the hosting comprising providing remote access to a virtual user interface;

automatically generating failover rules for hosting the virtual user interface as a function of the hosting of the virtual user interface;

automatically adjusting the failover rules for hosting the virtual user interface;

determining if a failover condition occurs, comprising at least one of:

detecting a soft failover condition; and detecting a hard failover condition; and automatically migrating the virtual user interface hosting to a different hosting component in the cluster if a failover condition occurs.

* * * * *